Jan. 8, 1929.

E. P. JOHNSON

SPOTLIGHT

Filed March 21, 1928

Edward P. Johnson
Inventor

By C. A. Snow & Co.
Attorneys

Jan. 8, 1929.  
E. P. JOHNSON  
SPOTLIGHT  
Filed March 21, 1928  
1,698,438  
2 Sheets-Sheet 2
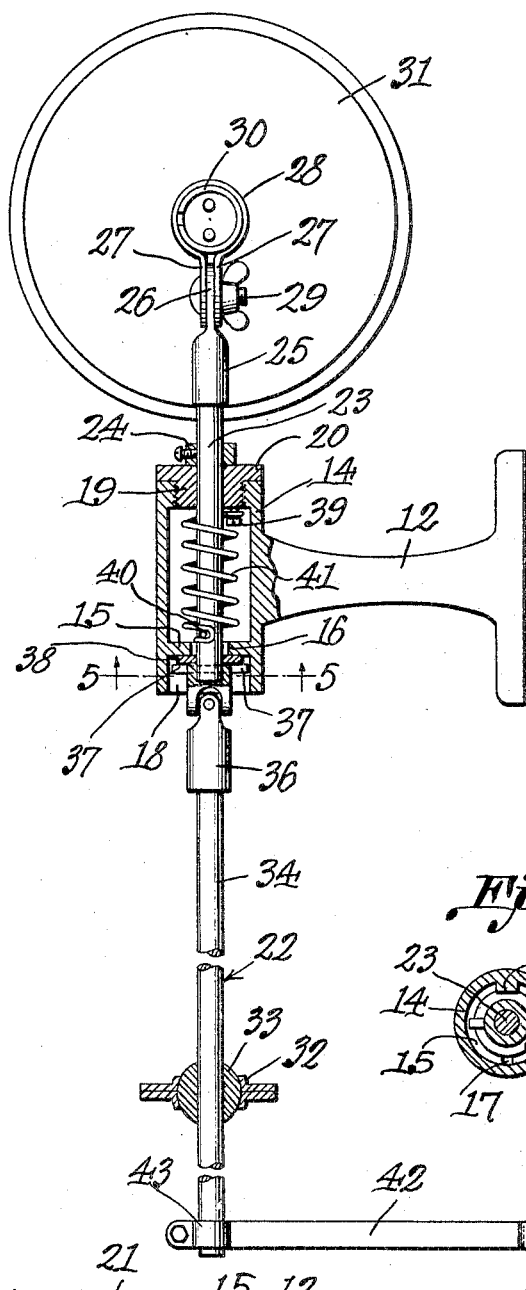
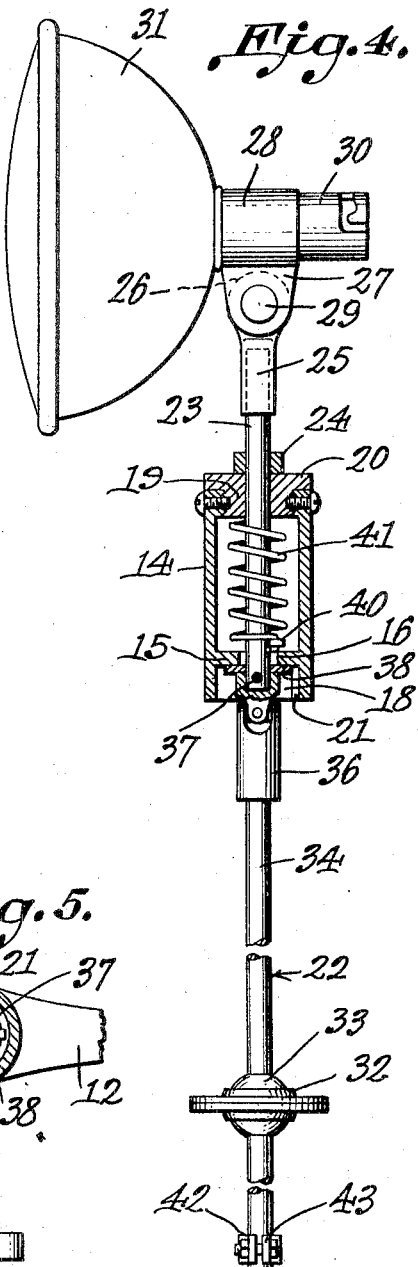
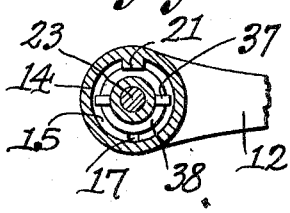
Edward P. Johnson  
Inventor  
By C.A.Snow&Co.  
Attorneys Patented Jan. 8, 1929.

1,698,438

UNITED STATES PATENT OFFICE.

EDWARD P. JOHNSON, OF CHICAGO, ILLINOIS.

SPOTLIGHT.

Application filed March 21, 1928. Serial No. 263,509.

This invention aims to provide a simple means whereby, through the operation of the steering mechanism of an automobile, a spot lamp on the automobile may be turned to illuminate the road ahead of the vehicle, when the vehicle rounds a curve or turns a corner.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 3 is a rear elevation of the lamp and attendant parts, portions being in section;

Figure 4 is a side view of the lamp, and attendant parts, portions being in section;

Figure 5 is a cross section on the line 5—5 of Figure 3;

Figure 6 is a plan of the tubular casing.

Figure 1:
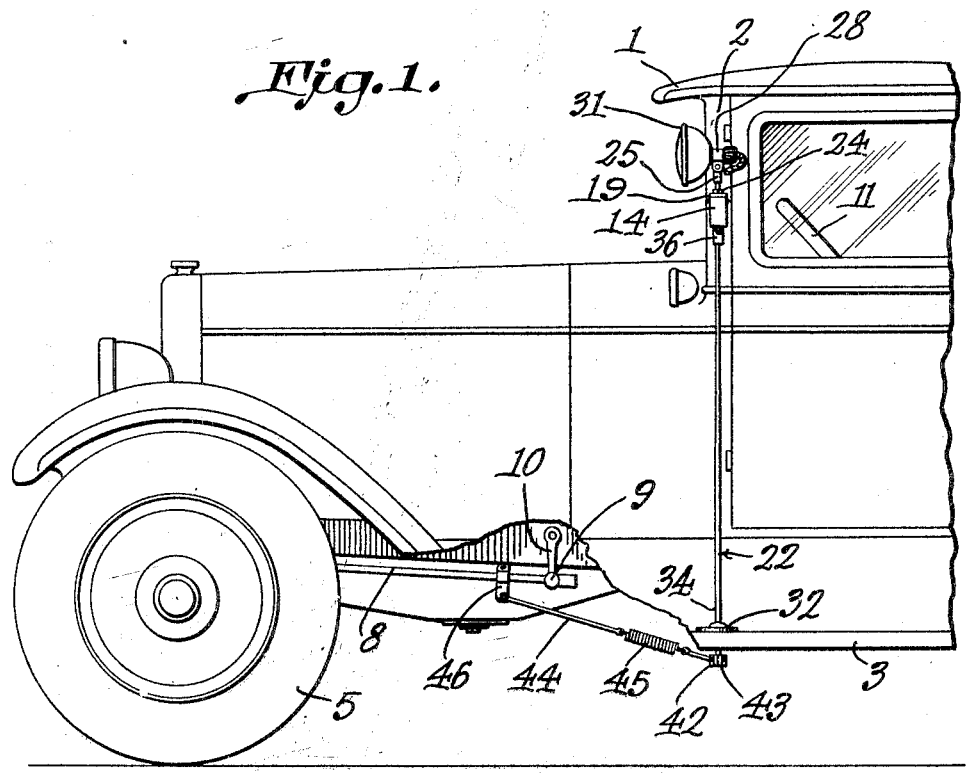
Figure 1 shows in side elevation, a portion of an automobile whereon the device forming the subject matter of this application has been mounted, parts being broken away.

The device forming the subject matter of this application may be mounted in any desired place on an automobile, and it may be connected in various ways with the steering mechanism, depending upon the make of the car. In the drawings, however, by way of illustration, there is shown an automobile 1, the body of which is marked by the numeral 2. The running board appears at 3, and the front axle at 4. The front wheels 5 are carried by the steering knuckles 6 which are pivotally mounted on the ends of the front axle 4. The steering knuckles 6 are connected by a transverse drag link 7. The forward end of an operating rod 8 is pivoted to one of the steering knuckles 6. The rear end of the operating rod 8 is connected by a ball joint 9 with the lower end of a radius arm 10 which is operated by the steering wheel 11. The construction described is common and well known, and no novelty is claimed for it, saving in so far as it may enter into patentable combination with parts hereinafter described.

The lamp may be placed in various locations on the vehicle, but by way of illustration, a bracket 12 is shown as secured to the body 2 of the vehicle near to the forward end of the body. The bracket 12, at its outer end, carries a vertical tubular casing 14. There is a transverse partition 15 in the casing 14. The partition 15 is spaced slightly from the lower end of the casing 14, so that there is formed in the lower end of the casing, below the partition 15, a chamber which is marked by the numeral 18. The partition 15 has a central opening 16 and is provided with a radial slot 17 which communicates with the opening 16. A stop lug 21 projects inwardly from the side wall of the casing 14, the stop lug 21 being located in the chamber 18, below the partition 15. A combined bearing plug and closure 19 is threaded into the upper end of the casing 14, the plug and closure 19 having a flange 20 which engages the upper end of the tubular casing 14.

The device includes a vertical lamp shaft which, as a whole, is marked by the numeral 22 in Figure 1 of the drawings. The lug shaft 22 includes a short upper part 23 which is extended through the central opening 16 of the partition 15, the member 23 of the shaft being journaled for rotation in the bearing plug and closure 19. An adjustable set collar 24 is mounted on the part 23 of the shaft 22, the set collar cooperating with the bearing plug and closure 19 to hold the shaft member 22 against downward movement with respect to the tubular casing 14. On the upper end of the part 23 of the lamp shaft 22 there is a socket 25 having a web 26 which is located between the arms 27 of the clamp 28. A pivot member and draw bolt 29 extends through the web 26 and the arms 27. The shank 30 of a lamp 31 is held in the clamp 28, and it is clear that, by loosening the bolt 29, the lamp 31 may be tilted vertically to any desired angle. By tightening up the bolt 29, the lamp 31 is held in any position to which it may have been adjusted.

A socket 32 is mounted on the running board 3. A ball 33 is mounted to rock in the socket 32. In the ball 33, the lower part 34 of the lamp shaft 22 is mounted to turn and to slide lengthwise. The upper end of the part 34 of the lamp shaft is connected to the part 23 of the lamp shaft by means of a universal joint 36. Attention is directed to the fact that in connecting the upper member of the universal joint 36 with the lower end of the shaft part 23, a securing element or cross pin 37 is used, the ends of the cross pin 37 projecting beyond the upper portion of the universal joint 36, laterally, as shown in Figure 5 of the drawings. The cross pin 37 not only serves as a connecting element for joining the universal connection 36 with the shaft 22, but, as well, the cross pin cooperates with the stop plug 21, as and for a purpose which will be described hereinafter. A bearing washer 38 is mounted on the lower portion of the shaft 23, the bearing washer being interposed between the universal joint 36 and the partition 15. A securing device 39, such as a threaded screw, is mounted in the lower end of the bearing plug 19. The part 23 of the lamp shaft has a lateral projection or pin 40. A torsion spring 41 is located within the casing 14 and is disposed about the part 23 of the lamp shaft, the upper end of the spring 41 being connected to the securing device 39, and the lower end of the spring 41 being mounted on the projection 40 of the shaft 23.

In the form selected to illustrate the invention, an arm 42 is secured by means of a clamp 43, adjustably, on the lower end of the part 34 of the lamp shaft 22. The numeral 44 indicates a flexible element, in which a retractile spring 45 is introduced. The rear end of the flexible element 44 is connected to the end of the arm 42. The forward end of the flexible element 42 is connected to a bracket 46 which is clamped securely but adjustably on the operating rod 8. Some persons may prefer to use a part other than the rod 8 for actuating the lamp, and there is no objection to this, since the device is so constructed that it may be mounted on vehicles of widely different constructions.

In practical operation the lamp 31 ordinarily points straight ahead, parallel to the line of advance of the vehicle, the ends of the cross pin 37 being spaced from the stop lug 21, as shown in Figure 5. When the steering wheel 11 is operated to cause the vehicle to deviate from a straight course, the radius arm 10 is swung, and longitudinal movement is imparted to the operating rod 8. Movement is transmitted from the operating rod 8 to the flexible element 44, and thence into the lamp shaft 22, by way of the arm 42. When the lamp shaft 22 is rotated, lateral swinging movement is imparted to the lamp 31, in a way which will be understood readily when the drawings are noted.

Figure 2:
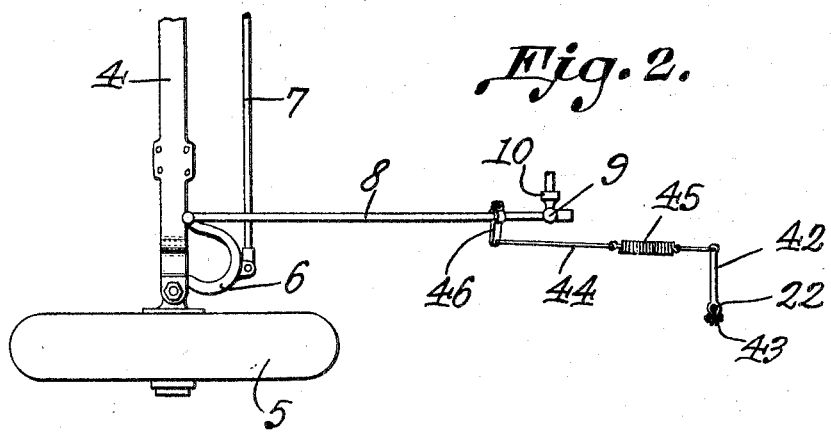
Figure 2 is a top plan showing a portion of the operating mechanism.

Owing to the fact that the universal joint 36 is provided, no reasonable amount of jar or strain will interfere with the mechanism, and the device is rendered unusually durable, on acount of the fact that the ball 33 which carries the lamp shaft 22 is mounted to rock in the socket 32. Any slight movement that happens to take place between the running board 3 and the rest of the body of the vehicle, will not disorganize the mechanism, because the shaft member 34 can slide in the ball 33, and because the ball 33 can rock a little in the socket 32. The spring 45 of Figure 2 serves to take up shocks when the steering mechanism is operated suddenly. The purpose of the slot 17 of Figure 6 is to permit the passage of the projection 40 when the shaft member 23 is mounted in place, during the assembling of the mechanism. When the shaft member 23 is rotated, the ends of the cross pin 37 may engage the stop pin 21 to limit the turning of the lamp 31 either to the left or to the right. The spring 38 is a return spring which restores the parts to the position shown in Figures 5 and 4.

Having thus described the invention, what is claimed is:—

1. In a device of the class described, a tubular casing, means for mounting the casing on a vehicle, a partition in the casing and spaced from the lower end of the casing to define a chamber, a combined bearing and closure on the upper end of the casing, a shaft extended through the partition and journaled in the bearing and closure, a torsion spring connected to the closure and located within the casing, the spring being connected to the shaft, a lamp on the upper end of the shaft, a universal joint in the shaft, and dividing the shaft into upper and lower members, a securing element connecting the universal joint with the upper member of the shaft and located in the chamber, a stop lug on the casing and located in the chamber, and so located as to cooperate with the ends of the securing element, and means for connecting the lower member of the shaft operatively with the steering mechanism of a vehicle.

2. In a device of the class described, a vehicle body including upper and lower parts, a bracket on the upper part of the body, a ball mounted to rock in the lower part of the body, a shaft journaled in the bracket, and slidable in the ball, a lamp on the upper end of the shaft, a universal joint interposed in the shaft and located between the ball and the bracket, and mechanism for rotating the shaft from the steering gear of a vehicle.

In testimony that I claim the foregoing as my own, I have hereto affixed my signature.

EDWARD P. JOHNSON.